United States Patent [19]
Yanase et al.

[11] Patent Number: 5,755,579
[45] Date of Patent: May 26, 1998

[54] SIMPLIFIED CONNECTING-TYPE ELECTRIC JUNCTION BOX WITH WIRING HARNESS

[75] Inventors: Takeshi Yanase; Tetsuro Saimoto, both of Shizuoka, Japan

[73] Assignee: Yazaki Corporation, Tokyo, Japan

[21] Appl. No.: 575,327

[22] Filed: Dec. 20, 1995

[30] Foreign Application Priority Data

Dec. 28, 1995 [JP] Japan .................................. 6-328656

[51] Int. Cl.⁶ .................................................. H01R 9/09
[52] U.S. Cl. ........................................ 439/76.2; 439/949
[58] Field of Search .......................... 439/76.2, 949, 439/621, 212, 361, 307, 214; 174/68.2, 70 B, 71 B, 72 B, 99 B

[56] References Cited

U.S. PATENT DOCUMENTS

| | | |
|---|---|---|
| 4,685,753 | 8/1987 | Isshiki et al. ............... 439/76.2 |
| 4,923,411 | 5/1990 | Hayashi et al. ............. 439/949 |
| 5,011,417 | 4/1991 | Matsumoto et al. ........ 439/76.2 |
| 5,530,625 | 6/1996 | Van Der Stuyf et al. .... 439/949 |

FOREIGN PATENT DOCUMENTS 5-18984  11/1994  Japan.

*Primary Examiner*—Neil Abrams
*Assistant Examiner*—Barry M. L. Standig
*Attorney, Agent, or Firm*—Armstrong, Westerman, Hattori, McLeland & Naughton

[57] ABSTRACT

An electric junction box includes a main case having a component connector, an under case having a harness connector, and a longitudinal busbar, which are mounted by making a board surface of the insulated substrate and the longitudinal busbar cross at right angles, and in which the longitudinal busbar is extended to the connector through junction terminals accommodated in the terminal-accommodating cavity. An under case, which is divided into a plurality of sub-cases corresponding to sub-wiring harnesses, is provided with an insulated supporting board for supporting a plurality of junction terminals and a longitudinal busbar. The described arrangement enables each of the separated insulated supporting boards to be fixedly installed in the main case by means of known ways, such as welding, or the like.

4 Claims, 11 Drawing Sheets

SIMPLIFIED CONNECTING-TYPE ELECTRIC JUNCTION BOX WITH WIRING HARNESS

BACKGROUND OF THE INVENTION

1. Field of the Invention

The present invention relates to an electric junction box used for interconnecting wiring harnesses.

2. Description of the Prior Art

Generally, in accommodating into an electric junction box a plurality of busbars and insulated substrates within a main case and an under case, many component connectors for connecting electric components, such as fuses, relays, and the like, are provided for the main case. Meanwhile, a plurality of wire harness connectors for connecting external wire harnesses are provided for the under case. Tabs (male terminals), which are provided for the busbars or junction terminals, are accommodated and arranged in the connectors.

Sub-harnesses are connected to each wiring harness connector by the connector unit. The sub-harnesses are organized according to an arranging direction (its destination) or a function of electrical machinery and apparatus (loading system) which may be, for example, a family of the lamps, such as a headlamp, a taillight and the like, or a meter board within an instrument panel, or wiring harness for the door by the connector.

However, in a conventional electric junction box, a plurality of wiring harness connectors for connecting the wiring harnesses are concentrated in the under case, thereby there are the following problems:

(1) A circuit of the busbar must be constituted in such a way that the tabs (male terminal), which are provided continuously for a plurality of busbars, are capable of being arranged and accommodated within the wiring harness connector with the result that the arrangement of the busbar becomes very complex and the number of layers required for the wiring board is increased.

(2) Since the wiring harness connectors are concentrated in the under case, the wiring harness cannot be produced by dividing it into each of the sub-harnesses. Accordingly, many pieces of intricate electric wires are required so that the operation is complicated with the result of susceptibility to inaccurate wiring and the quality thereof is unstable.

(3) Wiring for a busbar assembly which is stacked with a plurality of busbars and insulated substrates is integrated into one circuit body. Accordingly, it must be prepared with multiple kinds of stacked busbar wiring, the circuit arrangements of which are different from each other in accordance with a version, a grade or destinations. Further, when a circuit change, such as a reorganization of the optional circuitry, is carried out, a metal mold for forming the busbar must be newly designed and produced with the result that considerable cost and time are required and quick correspondence thereto can not be performed.

Due to these conditions, an electric junction box has been proposed in the Utility Model Application Laid-Open No. 5-18984 as shown in FIGS. 11 and 12.

In the drawings, reference numeral 1 designates a main case made of synthetic resin. An under case 2 is also made of synthetic resin. The under case 2 comprises three sub-cases $2_1$, $2_2$, and $2_3$. Three sub-harnesses $W_1$, $W_2$ and $W_3$, which form a wiring harness W, are connected to the sub-cases $2_1$, $2_2$, and $2_3$, respectively. A plurality of fuse cavities 3 and relay cavities 4 for connecting fuses F and relays R are provided for an outside surface of the main case 1. A plurality of longitudinal busbars 5 are mounted corresponding to each of the sub-cases $2_1$, $2_2$, and $2_3$. Terminal-accommodating cavity groups $3_a$, $3_b$ forming the fuse cavity 3 and terminal accommodating cavity groups $4_a$ to $4_d$ forming the relay cavity 4, which are capable of being communicated between the upper side of the cases and the lower side thereof, are provided for the insulated substrate 6 within the main case 1. Various joint terminals 7 to 12 are forced and fixed in these terminal-accommodating cavities. A busbar-accommodating wall 13 having a groove 13a is continuously provided between these terminal-accommodating cavities 3a and 4a. The longitudinal busbar 5 is forced into and fixed within the groove 13a.

The joint terminal 7 connects, for example, a source side terminal (tab) of the above relay R with the longitudinal busbar 5. As shown in FIG. 13, one busbar-connecting part 7a is integrally provided with the other tab-connecting part 7d. The busbar-connecting part 7a includes groove 7b for receiving the busbar and an elastic contacting piece 7c. The tab-connecting part 7d includes a square shaped tab-receiving space 7e and converging elastic contacting pieces 7f.

The junction terminal 10, which is shaped the same as the above junction terminal 7, connects the fuse F with the longitudinal busbar 5. Junction terminals 8 and 9 are junction terminals for branch connections which are connected to the longitudinal busbar 5, the junction terminal 8 itself having a tab 8a, and the junction terminal 9 being connected to a male terminal 14 on the sub-harness side. Junction terminals 11 and 12 are female-and-female joint terminals for connecting the fuse F and a tab for relay R with a male terminal 14 of the sub-harness. In the drawings, reference numeral 15 represents an electric wire and reference numeral 16 is a housing for the male terminal 14. Housings 16 are provided correspondingly for the terminal-accommodating cavities $3a$, $3b$ and $4a$ to $4d$ of each sub-case $2_1$, $2_2$, . . . .

In the conventional electric junction box, as shown in FIG. 14, when the main case 1 is fitted onto the sub-case $2_1$, the joint terminal 9 is associated with the male terminal 14. Under this circumstance, as described above, the joint terminal 9, together with the longitudinal busbar 5, is forced into the terminal-accommodating cavity 3a. For this reason, it may cause the sub-case $2_1$, to separate from the main case 1 and, since the male terminal 14 is rigidly joined to the joint terminal 9, the joint terminal 9 is in danger of dropping out of terminal-accommodating cavity 3a. Thus, there is a problem that much maintenance is required. In order to improve this point, a flexible connecting arm is provided on the joint terminal 9 on the inside of the terminal-accommodating cavity 3a, or an engaging lance is required for the terminal itself. However, in either case, the internal structure of the terminal-accommodating cavity and the structure of the terminal itself become complicated with the result of increased costs. Consequently, this arrangement cannot be adopted.

Further, when the sub-case $2_1$ is caused to fit into main case 1, since there exists a gap between the male terminal 14 and the housing 16 accommodating the terminal therein, in some cases, a pointed end portion 14a of the male terminal 14 deviates from the normal interdigitation range of the junction terminal 9, and in a worst case, an elastic tongue 9a of the joint terminal 9 might suffer damage. In addition to this, there is a problem that the male terminals are difficult to fit to the other terminals because there exist many kinds of joint terminals 7 to 12.

SUMMARY OF THE INVENTION

In view of the foregoing, it is an object of the present invention to provide an electric junction box which does not suffer damage during joining of the male terminal and in which the joint terminal or the longitudinal busbar will not drop out of the main case.

It is another object or the present invention to provide an electric junction box in which precision of positioning for the joint terminal and the longitudinal busbar within the main case and assembling property are excellent.

It is a further object of the present invention to provide an electric junction box in which the sub-case is assembled accurately into the main case.

According to a first aspect of the present invention, for achieving the above-described objects, there is provided an electrical junction box having a main case, an under case fitted in the main case, a circuit component composed of an insulated substrate and a plurality of longitudinal busbars which are mounted so as to make a board surface of the insulated substrate and the longitudinal busbar cross at right angles, the circuit component being accommodated by means of the main case and the under case, a component connector for connecting electrical components, such as a fuse, a relay, and so forth, being provided for an outer side wall of the main case, and a wiring harness connector for connecting mainly outer wiring harnesses being provided for an outer side wall of said under case, wherein circuitry is caused to extend from both said component connector and the wiring harness connector through a junction terminal which is accommodated in a terminal-accommodating cavity of the component connector or a busbar. It further causes the under case to be divided into a plurality of sub-cases corresponding to the sub-wiring harnesses forming the wiring harness. The electric junction box comprises an insulated supporting board for supporting a plurality of the junction terminals and longitudinal busbars are provided corresponding to each of the separated sub-cases, thus enabling each of the separated insulated supporting boards to be fixed into the main case in known ways, such as by welding or the like.

According to a second aspect of the present invention, there is provided an electrical junction box with a connecting portion for selectively integrally combining with each of the insulated supporting boards, and a notch portion for avoiding interference with the connecting portion provided on a periphery wall of the corresponding sub-case.

According to a third aspect of the present invention, there is provided an electric junction box with a pilot hole for locating for the assembly provided both on the main case and the separated insulated supporting board, a plurality of welding bosses provided on the main case, and a plurality of boss holes corresponding to the welding bosses provided on the separated insulated supporting board, at least two boss holes of a plurality of boss holes for each of the separated insulated supporting boards formed accurately as a forcing hole for locating.

According to a fourth aspect of the present invention, there is provided an electric junction box with a guide wall for simplifying location of each of the sub-cases having a height thereof higher than a periphery portion.

As stated above, the electric junction box according to the first aspect of the present invention is provided with a junction terminal and the longitudinal busbar, which constitutes the internal circuit of the electric junction box is supported by the insulated supporting board, thereby there is no danger that the terminal and busbar will fall off during maintenance, thus preventing automobile breakdown during travelling.

As stated above, in the electric junction box according to the second aspect of the present invention, the separated insulated supporting boards are combined with the connecting portion, thereby enabling the insulated supporting board to be dealt with as one member so that it is useful for storage of parts and for reduction of assembling man-hours. Further, the periphery wall of the sub-case is provided with a notch portion to prevent interference with the connecting portion so that there is no obstacle to handling the same as is the case with the separated insulated supporting board.

As stated above, the electric junction box, according to the third aspect of the present invention, eliminates many welding bosses in the main case and at least two boss holes in each of the separated insulated supporting boards for accurate location, and it enables remaining boss holes to fit with a gap, so that the assembling work is capable of being performed while maintaining location accuracy.

As stated above, the electric junction box, according to the fourth aspect of the present invention, is provided with a guide wall on each of the sub-cases for the side wall of the main case, thereby enabling fitting work for the sub-cases to be performed easily.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

Figure 1:
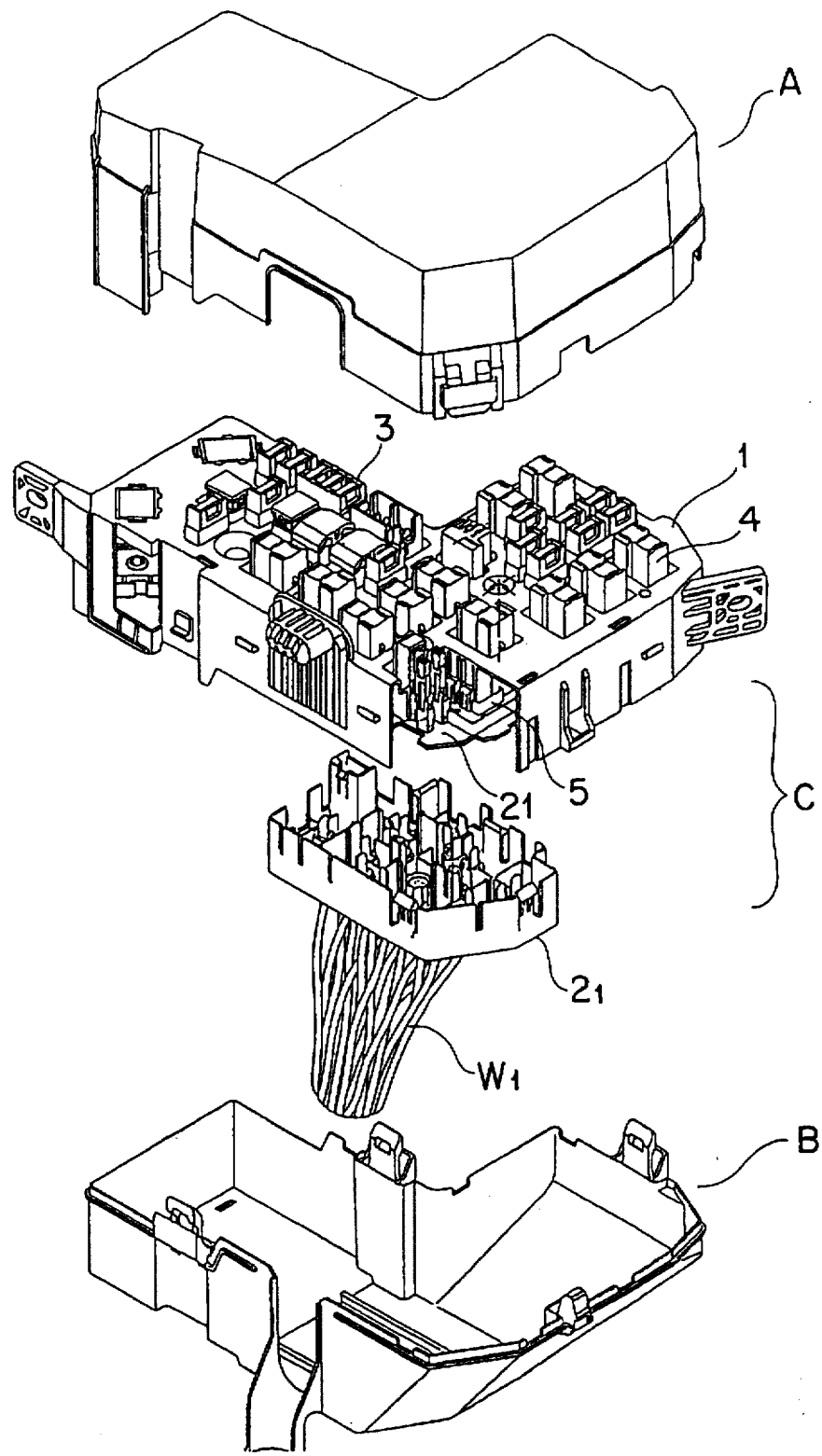
FIG. 1 is a perspective view showing a separated condition of an electric junction box of an embodiment according to the present invention.
Figure 2:
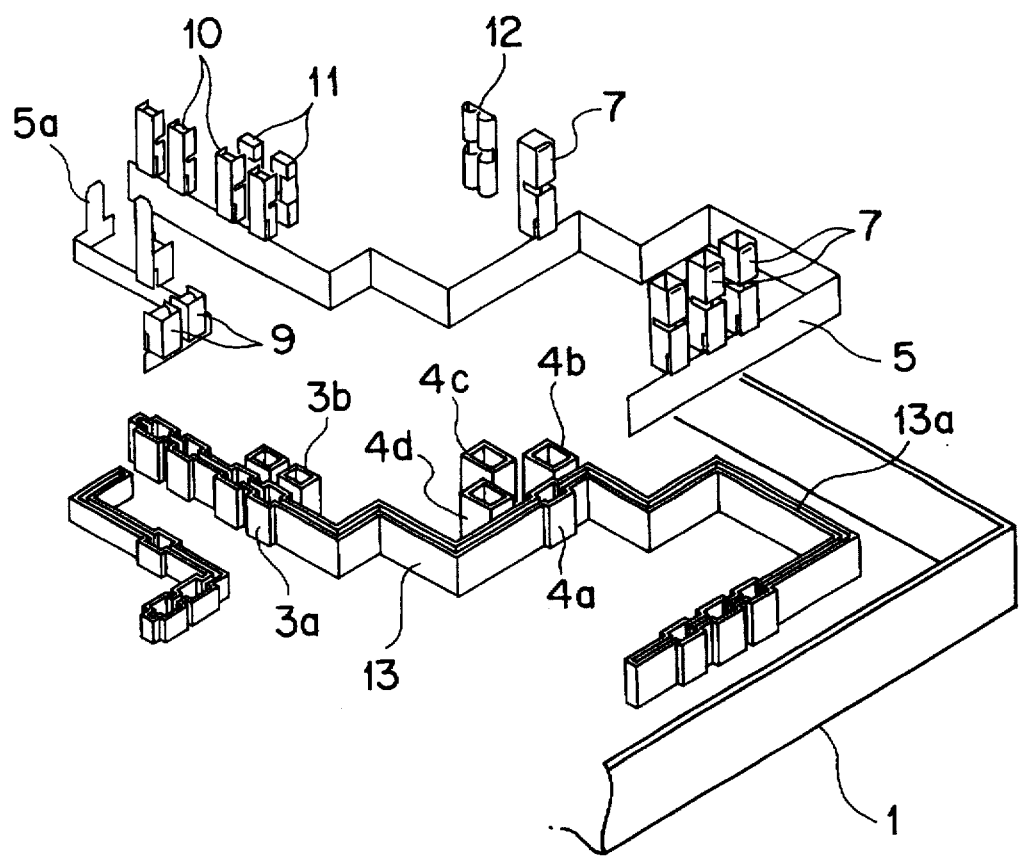
FIG. 2 is a partly enlarged perspective view showing a jointing structure of the busbar of FIG. 1 and the joint terminal.
Figure 3:
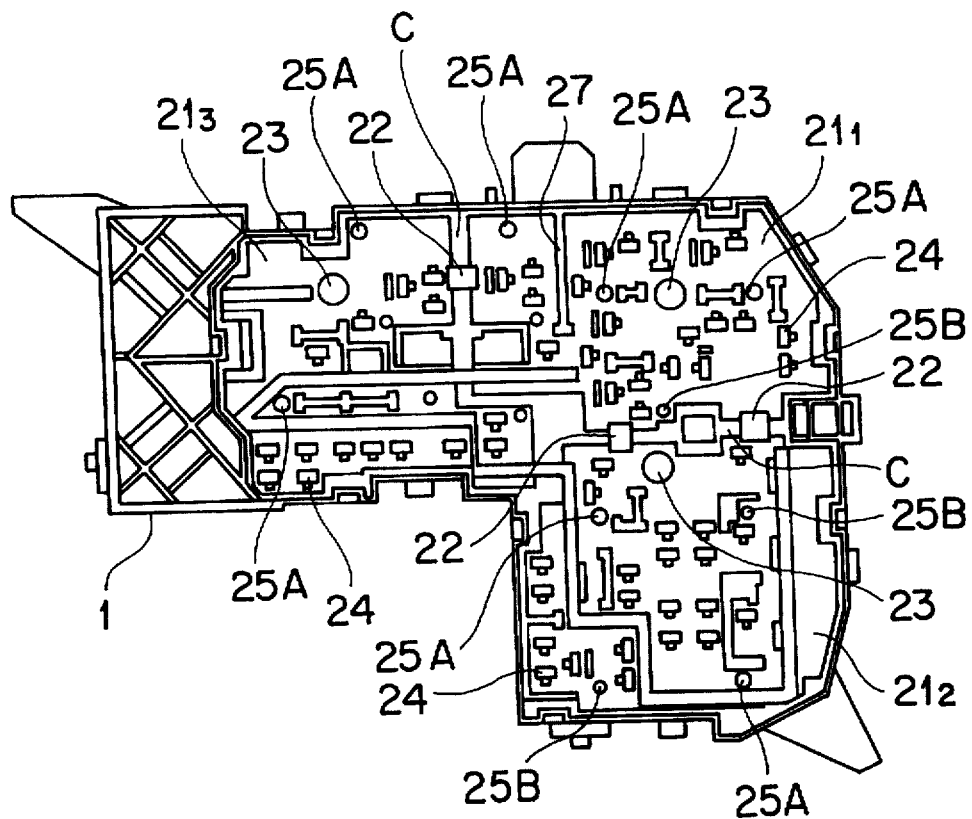
FIG. 3 is a plan view showing an insulated supporting board for each sub-case of FIG. 1.
Figure 4:
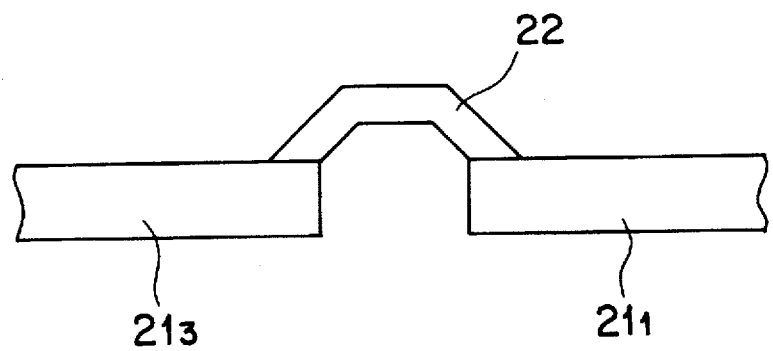
FIG. 4 is a sectional view showing a joint position of the insulated supporting board of FIG. 3.
Figure 5:
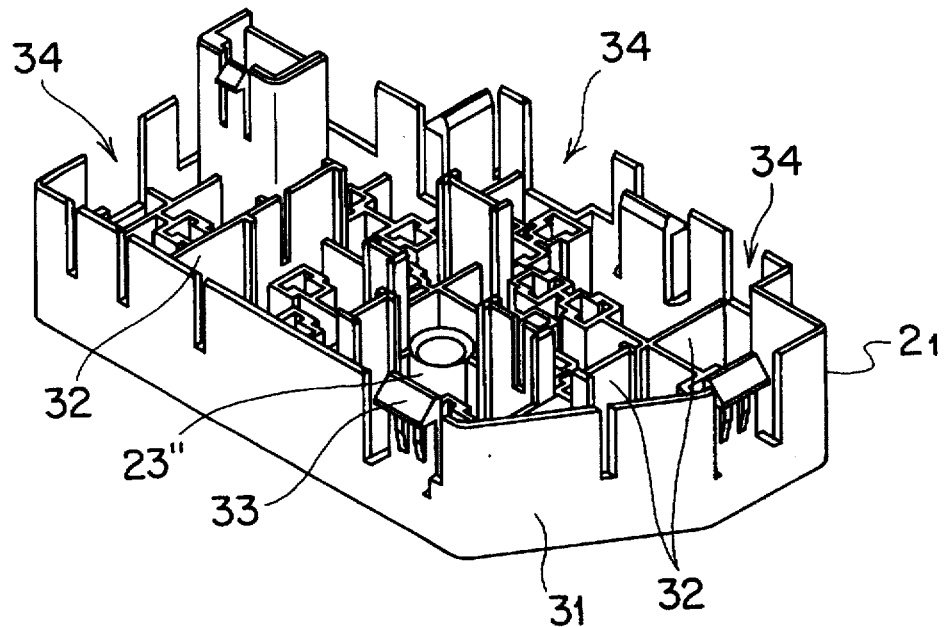
FIG. 5 is an enlarged perspective view showing a sub-case $2_1$ of FIG. 1.
Figure 6:
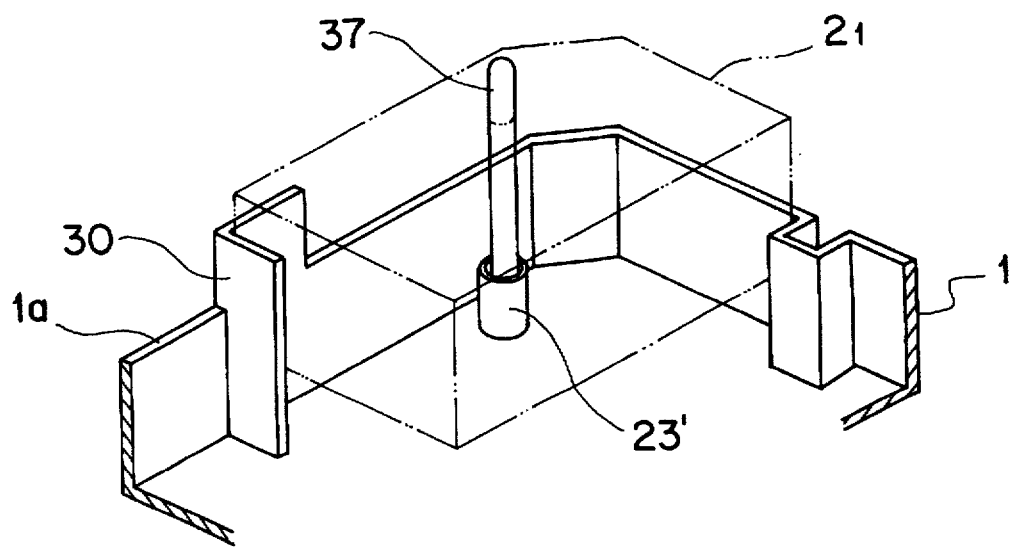
FIG. 6 is a partly enlarged perspective view showing the main case cooperating with the sub-case of FIG. 5.

A preferred embodiment of the present invention will now be described in detail referring to the accompanying drawings. FIG. 1 is a perspective view showing a separated condition of an electric junction box of an embodiment according to the present invention. FIG. 2 is a partly enlarged perspective view showing a jointing structure of the busbar of FIG. 1 and the joint terminal. FIG. 3 is a plan view showing an insulated supporting board of each sub-case of FIG. 1. FIG. 4 is a sectional view showing a joint position of the insulated supporting board of FIG. 3. FIG. 5 is an enlarged perspective view showing a sub-case $2_1$ of FIG. 1. FIG. 6 is a partly enlarged perspective view showing the main case cooperating with the sub-case of FIG. 5. In these drawings, the descriptions of the component parts common to the prior art are omitted here to avoid unnecessary repetition.

In FIG. 1, symbol A designates an upper cover made of synthetic resin, B a lower cover also made of synthetic resin. They cause the electric junction box C, comprising the main case 1 and the under case 2, to be covered with the upper cover A and the lower cover B. The main case 1 has a plurality of component connectors, such as the fuse cavity 3, the relay cavity 4, and so forth, on the outside surface thereof. The under case 2 is composed of a plurality of sub-cases $2_1$, $2_2$, $2_3$ which are corresponding to a plurality of sub-harnesses $W_1$, $W_2$, $W_3$, respectively. Further, in main case 1, a plurality of elongated busbars 5 are forced into the groove 13a of the busbar supporting wall 13. Various joint terminals 7 to 12 are accommodated and arranged in the terminal-accommodating cavity groups 3a, 3b and 4a to 4d.

Figure 11:
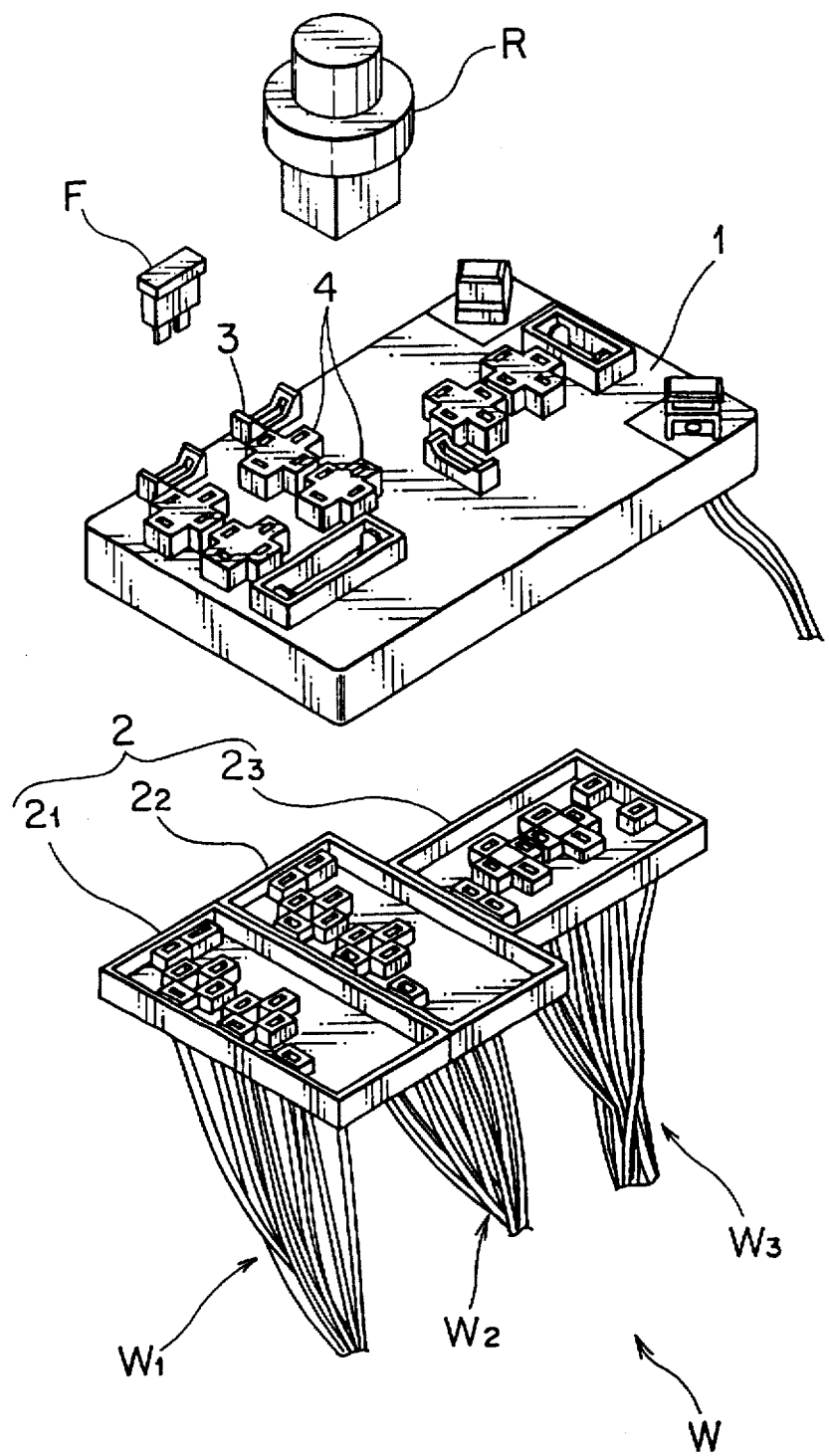
FIG. 11 is a perspective view showing the separated condition of a conventional electric junction box.
Figure 12:
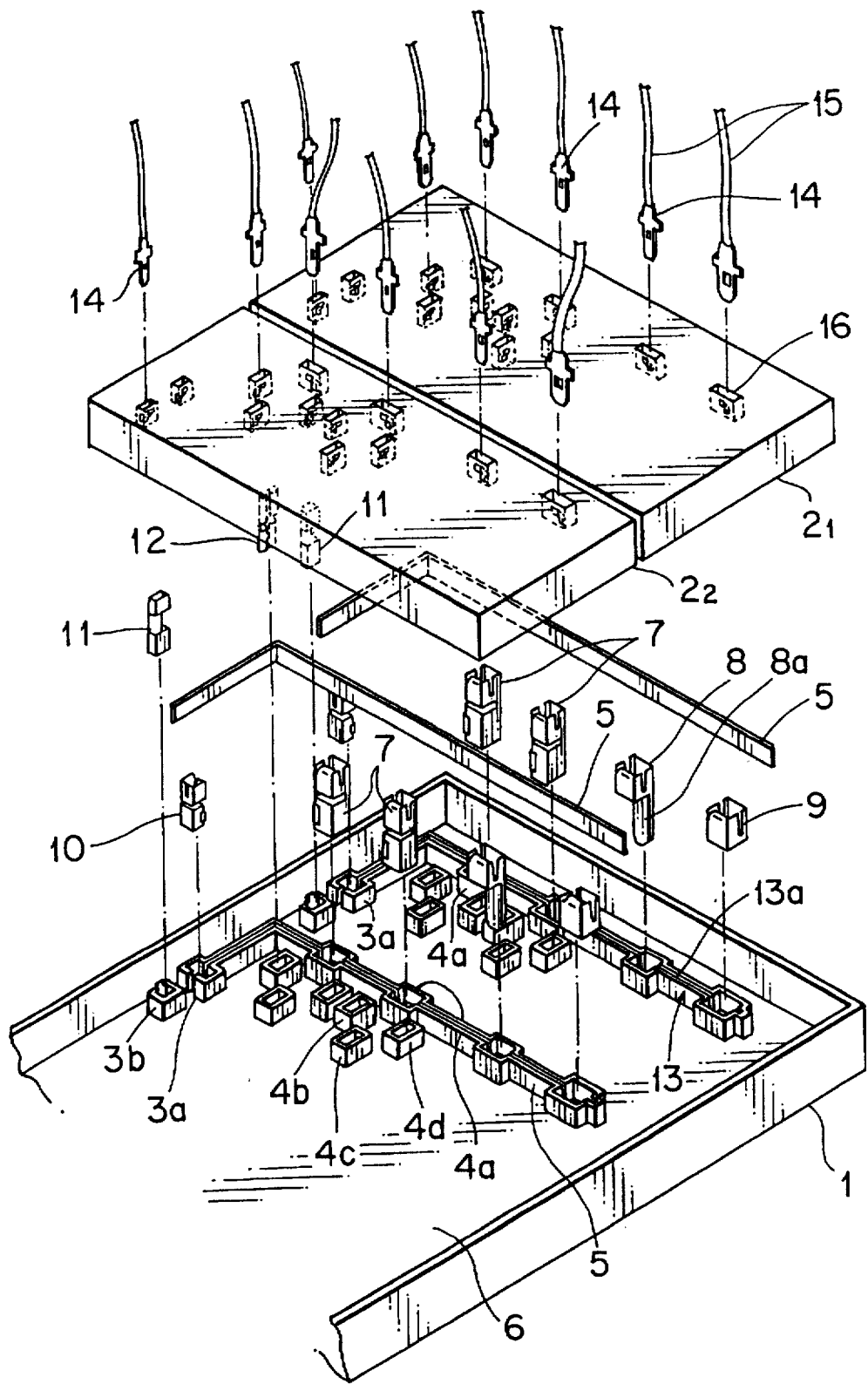
FIG. 12 is an exploded inverted perspective view of a principal portion of the elements shown in FIG. 11.
Figure 13:
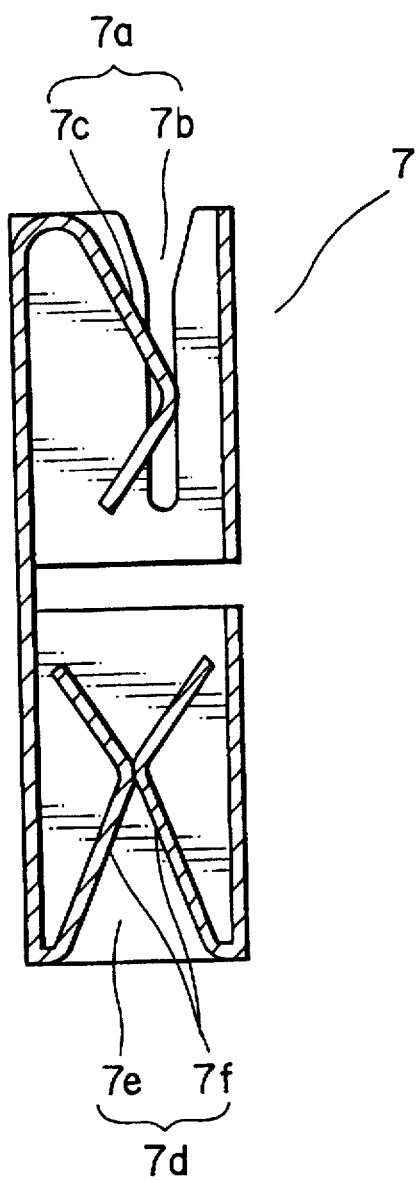
FIG. 13 is a sectional view showing the joint terminal 7 of FIG. 12.

The foregoing reviews the same structure as the conventional example shown in FIGS. 11 to 13. In the present invention, the separated supporting boards $2_1$, $2_2$, $2_3$ (hereinafter designated generally as 21) are caused to provide to each of the sub-cases $2_1$, $2_2$, $2_3$, respectively, an isolated supporting board 21 fixed on the main case 1.

Each of the isolated supporting boards 21 is capable of being dealt with as one piece of the isolated supporting board, since they are integrated with each other by a plurality of joint portions 22 and with an arbitrary spacing C. The joint portion 22 is formed in the shape of the bridge and has elasticity. It is desirable that each of the isolated supporting boards be permitted to undergo a divergence of relative positions.

Figure 9:
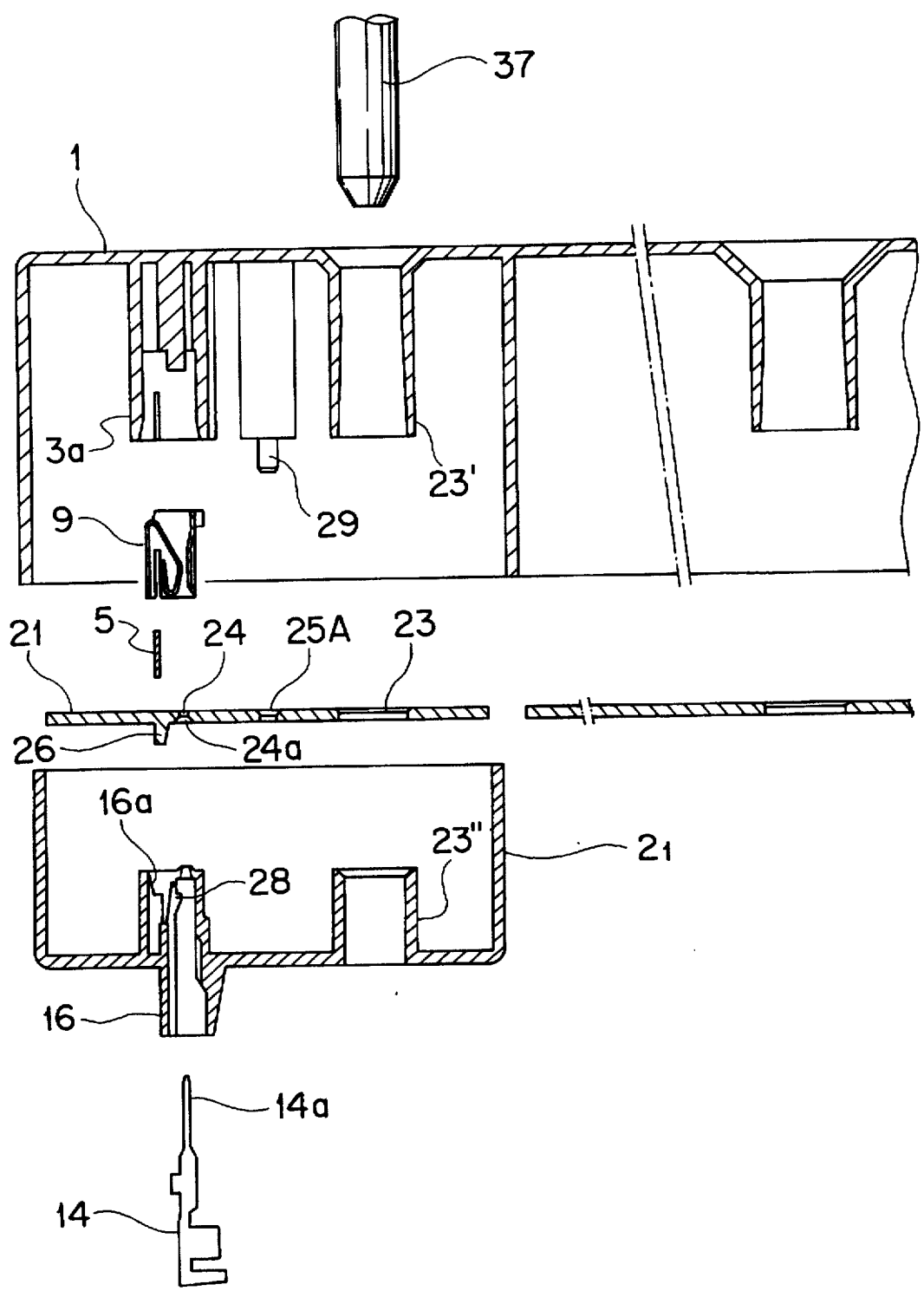
FIG. 9 is a sectional view showing a condition just before the assembling of the main case and the sub-case of FIG. 1.
Figure 10:
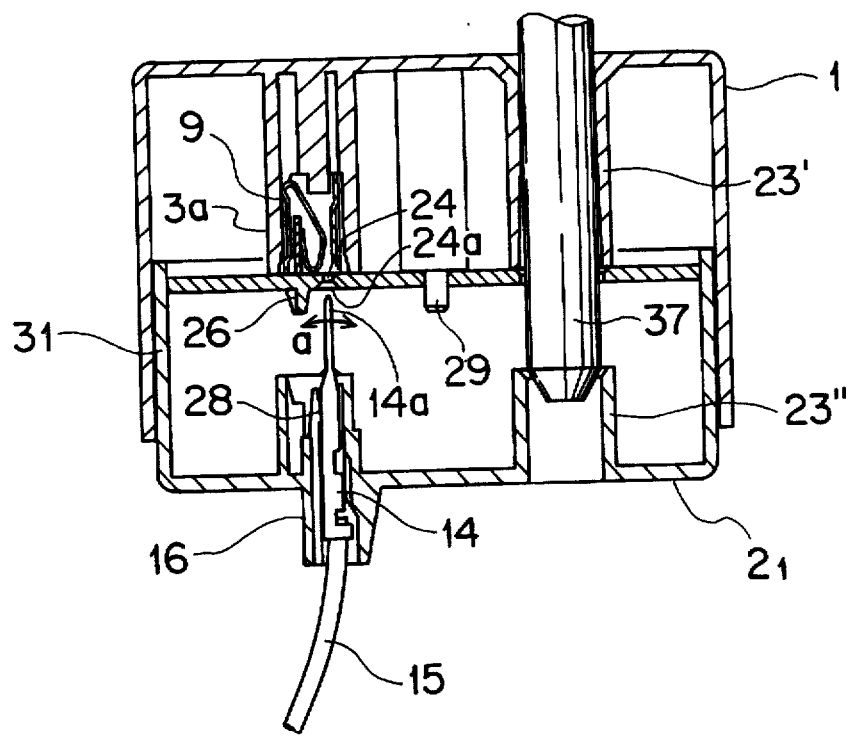
FIG. 10 is a sectional view showing the assembled condition of the elements shown in FIG. 9.

Further, the isolated supporting boards 21 are each provided with one pilot hole 23, many terminal insertion holes 24, together with a plurality of holes for bosses. A spacer 26 (referring to FIG. 9), which corresponds to a housing 16 of each of the sub-cases $2_1$ to $2_3$ is projected on the reverse side surface of the isolated supporting board 21. Furthermore, a slit 27 for relief, which cooperates with a reinforcement rib 32 (described later) within each of the sub-cases $2_1$ to $2_3$, is provided for the insulated supporting board 21.

The pilot hole 23 is not necessarily formed with an exact dimensional accuracy to the pilot pin 37 of an assembling jig 36 described later. It enables the pilot hole 23 to be formed with rough dimensions which produce a relatively large clearance.

A tapered insertion guide 24a (referring to FIG. 9), which causes a pointed end portion 14a of the male terminal 14 to be introduced toward the reverse surface side of the insulated supporting board 21, is formed within the terminal insertion hole 24.

There are two kinds of boss holes, one boss hole 25A serves a double purpose in that it causes the insulated supporting board 21 itself to locate itself accurately to the main case 1 and it permits a welding boss 29 to be forced therein. The other boss hole 25B has a dimension that the welding boss 29 is inserted with clearance. It is desirable that each insulated supporting board 21 be provided with at least two holes mutually spaced as long as possible such as at both end portions of a diagonal line thereof, or the side thereof, across the board 21.

A spacer 26 enters between an inside wall 16a of the housing 16 and a flexible connecting arm 28 so that the spacer 26 restrains the elastic deformation of the flexible connecting arm 28 connecting the male terminal 14.

A plurality of the terminal insertion holes 24 and their mutual dimensions are determined by using the boss hole 25A, which is the nearest hole in said insulated supporting board, as a basis of dimension without using the pilot hole 23, with the result that it becomes easy to locate accurately a plurality of terminal insertion holes 24.

A pilot hole 23' which corresponds to the pilot hole 23 of each of the insulated supporting boards 21 is provided for the main case 1 and a welding boss 29, which corresponds to each of a plurality of boss holes 25A, is provided for the main case 1. As shown in FIG. 6, a guide wall 30, which is higher than the periphery portion of the main case 1, is provided for the periphery wall 1a thereof. The guide wall 30 is provided at the concerned portion of the main case 1 to receive the corresponding fitted portion of each of the sub-cases $2_1$ to $2_3$.

Each of the sub-cases $2_1$ to $2_3$ has a periphery wall 31, which protects against outside difficulties, a pointed end portion (contact portion) 14a of the male terminal 14 that projects from each of the housings 16, and has a plurality of backup ribs 32. A locking arm 33, which engages a locking portion (not illustrated) on the main case 1, is provided on the periphery wall 31, and a plurality of notch portions 34 for preventing interference with the connecting portion of the insulated supporting board 21 are provided in the periphery wall 31.

Next, an assembly for the electric junction box will be described.

Figure 7:
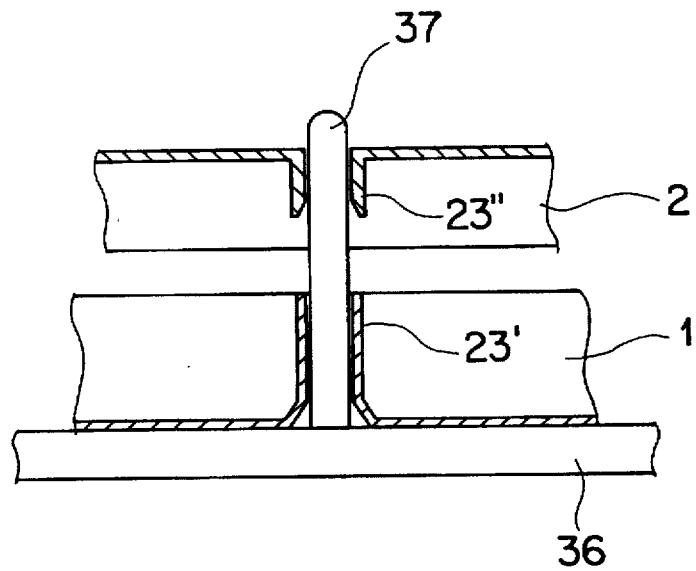
FIG. 7 is an explanatory view showing a positioning method for assembling the main case and the sub-case of FIG. 6.

First, as shown in FIG. 7, the reverse surface of the main case 1 is permitted to be set to a pilot pin 37 of the assembling jig 36 through the pilot hole 23' of the main case 1.

Under the condition, the designated junction terminals selected among each of the junction terminals 7 to 12 are caused to be inserted into each of the terminal-accommodating cavity 3a, 3b, and 4a to 4d (referring to FIG. 12).

These junction terminals 7 to 12 are enabled to be inserted easily by only thrusting them in from above because the terminals have no engaging members, such as the engaging lance, and so forth, as described above.

Next, like the case as shown in FIG. 12, the busbar 5 is caused to be forced into the groove 13a of the supporting wall 13, and each of the junction terminals 7 to 10 is connected.

After forcing the busbar 5, from top thereof the insulated supporting board 21 is covered, and welded so that the busbar 5 is fixed.

Thus, since each of the insulated supporting boards $21_1$ to $21_3$ are integrated by the connecting portion 22 resulting in one piece, positioning is very simple with each of the pilot pins 37 of the above assembling jig 36 being pushed into the roughly formed pilot hole 23 so that several assembly steps occur simultaneously.

On account of the above pushing work, an approximate positioning between the welding boss 29 of the main case 1 and each of the insulated supporting boards $21_1$ to $21_3$ is carried out by a plurality of boss holes 25B with ample room for insertion.

Next, each of the insulated boards $21_1$ to $21_3$ is caused to be rigidly pressurized individually so that the pointed end portion of the welding boss 29 is inserted into the boss hole 25A for accurate positioning. During pressurizing, each of the insulated supporting boards $21_1$ to $21_3$ is capable of being moved in all directions with minute motions because the flexible joint portions 22 intervene among the insulated supporting boards $21_1$ to $21_3$, which are accurately located without producing any localized stress-strain in the particular insulated supporting board 21.

After the forcing and locating of the insulated supporting board 21, the pointed end portion of the welding boss group 29 projected from the boss holes 25A and 25B are caused to be heated and to weld by means of a heater (not illustrated) so that each of the insulated supporting boards $21_1$ to $21_3$ are fixed to the main case 1. For this reason, since each of the junction terminals 7 to 12 and the longitudinal busbar 5 are supported on the insulated supporting board 21, a danger of falling therefrom is completely eliminated, thereby preventing the possibility of a breakdown of the automobile while travelling.

Lastly, each of the sub-cases $2_1$ to $2_3$, which are formed separately, are caused to fit the main case 1 so that the male terminal 14 is permitted to connect with the above junction terminals 7 to 12.

Figure 8:
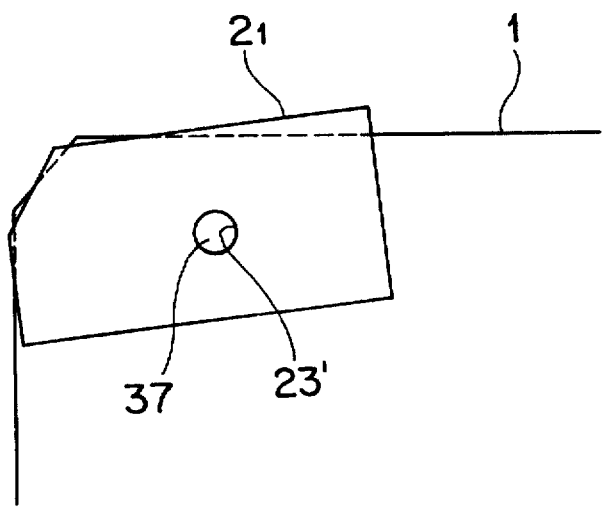
FIG. 8 is an operational explanatory view showing the positioning method of FIG. 7.

Therefore, as shown in FIGS. 6 and 7, for example, the pilot hole 23" of the sub case $2_1$ is permitted to fit onto the pilot pin 37 and the peripheral wall 31 is caused to press into the main case 1 along the guide wall 30. Since the sub-case $2_1$ is located by two devices, which are the pilot pin 37 and the guide wall 30, as shown in FIG. 8, the sub-case $2_1$ is able to be pressed smoothly into the main case 1 because there is no divergence position as the sub-case $2_1$ rotates around the pilot pin 37.

Since the important position of the periphery wall 31 of the sub-case $2_1$ is provided with the notch portion 34, the sub-case $2_1$ enters the gap avoiding the joint portion 22 between each of the insulated supporting boards $21_1$ to $21_3$. The reinforcement rib 32 within the sub-case $2_1$ is able to enter the slit 27 of the insulated supporting board 21. Further, the sub-case $2_1$ is permitted to be pressed into the main case 1 so that the pointed end portion 14a of the male terminal 14 is caused to penetrate the terminal insertion hole 24 to be connected to the junction terminal 9 within the terminal-accommodating cavity 3a.

Figure 14:
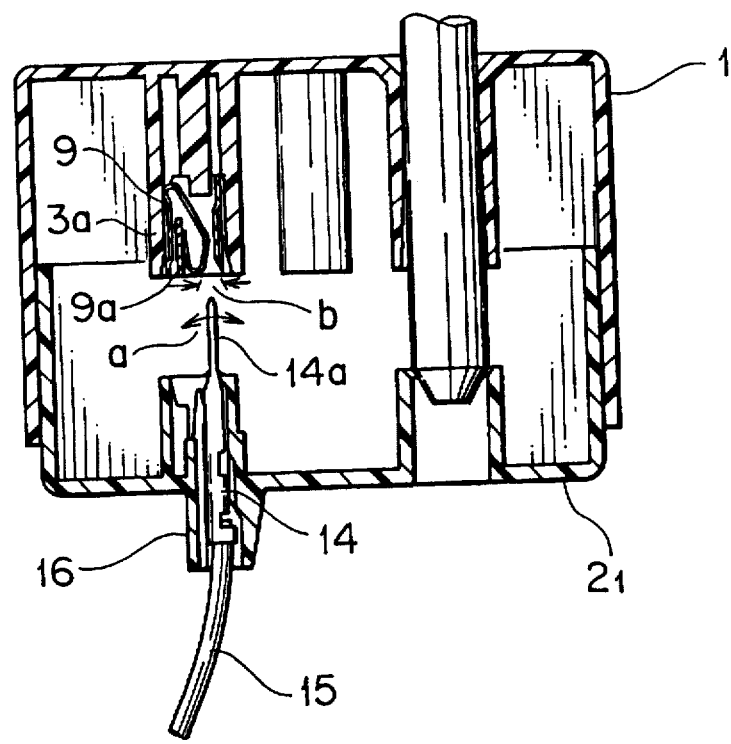
FIG. 14 is a sectional view of a principal portion showing the assembled structure of the sub-case and the main case of FIG. 11.

The terminal insertion hole 24 has a tapered insertion guide 24a and also is located accurately based upon the accurate positioning of the boss hole 25A so that the pointed end portion 14a of the male terminal 14 can be smoothly introduced into the junction terminal 9 without deviating from the normal fitting range b (FIG. 14). There is no danger that it causes damage to the elastic tongue 9a.

Thus, each of the sub-cases $2_1$ to $2_3$ is smoothly fitted into main case 1 so that the male terminal 14 is permitted to combine with each of the junction terminals 7 to 12 and each of the sub-cases $2_1$ to $2_3$ is locked by means of the locking arms 33 simultaneously engaging the cooperating locking portions in the lower cover B.

As described in the foregoing, according to the first aspect of the present invention, the junction terminal and the longitudinal busbar, which constitute the internal circuit of the electric junction box, are supported by the insulated supporting board. Thus, there is no danger that the terminal and busbar will become disengaged during the maintenance, and the breakdown during travelling of the associated automobile is prevented. Further, it is not necessary to provide an engaging means, such as an engaging lance for the junction terminals, or the terminal-accommodating cavity. Consequently, the production cost of a metal mold for molding is reduced enabling a low price due to such low cost production.

According to the second aspect of the present invention, because the separated insulated supporting boards are combined by the joint portions, the combined insulated supporting boards are able to be dealt with as one member so that it is useful for storage of parts and for reduction of assembling man-hours. Further, the periphery wall of the sub-case is provided with the notch portion to relieve the connecting portion so that there is no obstacle for installation and removal.

According to the third aspect of the present invention, the many welding bosses of the main case and at least two boss holes in each of the separated insulated supporting boards serve to enable the structure to be accurately located, and it also enables the remaining boss holes to fit with clearance, so that the assembling work is capable of being performed while maintaining the locating accuracy.

According to the fourth aspect of the present invention, since there is provided the guide wall on each of the sub-cases to cooperate with the side wall of the main case, the fitting work for the sub-cases can be performed easily.

What is claimed is:

1. An electric junction box comprising:
   a main case;
   an under case fitted in said main case;
   a circuit component composed of an insulated substrate and a plurality of longitudinal busbars upstanding from a surface of said insulated substrate, said circuit component being received in said main case and said under case;
   component connector means for connecting electrical components provided on an outer wall of said main case;
   wiring harness connector means for connecting a plurality of groupings of external wiring harnesses provided on an outer wall of said under case, circuits extending between said component connector and said wiring harness connector through junction terminals accommodated in terminal-accommodating cavities in said component connector or a busbar, and said under case being divided into a plurality of sub-cases operative to receive respective of said groupings of said wiring harnesses; and
   a separated insulated supporting board associated with each of said sub-cases for supporting a plurality of said junction terminals and longitudinal busbars operative in each of said separated sub-cases, and each of said separated insulated supporting boards being fixed to said main case.

2. An electric junction box according to claim 1, further comprising a joint portion for connecting adjacent insulated supporting boards at selected locations therealong, and a notch portion for avoiding an interference with said joint portion provided on a periphery wall of the corresponding sub-case.

3. An electric junction box according to claim 1 or claim 2, further comprising pilot holes for fitting said separated insulated supporting boards onto said main case, a plurality of welding bosses provided on said main case, and a plurality of boss holes corresponding to said plurality of welding bosses provided in said separated insulated supporting board, at least two boss holes of said plurality of boss holes in each of said separated insulated supporting boards being for accurately locating said welding bosses.

4. An electric junction box according to claim 1 or claim 2, further comprising a guide wall on each of said sub-cases having a height higher than that of a periphery wall portion thereof said guide wall being operative to engage a wall of said main case of said main case to facilitate accurate location of said sub-case with respect to said man case.

* * * * *